United States Patent [19]

McDonald et al.

[11] 3,764,829

[45] Oct. 9, 1973

[54] ADAPTIVE TRANSISTOR SWITCH

[75] Inventors: James A. McDonald, Downers Grove; William R. Ziemer, Des Plaines, both of Ill.

[73] Assignee: Motorola, Inc., Franklin Park, Ill.

[22] Filed: June 9, 1972

[21] Appl. No.: 261,463

[52] U.S. Cl. .................. 307/255, 307/237, 307/270, 307/299, 307/313, 330/24, 330/29

[51] Int. Cl. ......................... H03k 17/60, H03g 3/30

[58] Field of Search .................... 307/213, 214, 215, 307/218, 237, 255, 264, 270, 288, 297, 299; 323/1, 4; 328/172; 330/30 D, 38 M, 24, 29

[56] References Cited

UNITED STATES PATENTS

| | | | |
|---|---|---|---|
| 3,588,672 | 6/1971 | Wilson | 323/4 |
| 3,624,489 | 11/1971 | Betton | 323/4 |
| 3,317,817 | 5/1967 | Gershen | 323/4 |
| 3,320,439 | 5/1967 | Widlar | 307/297 |
| 3,390,285 | 6/1968 | Schoen | 307/270 X |
| 3,392,342 | 7/1968 | Ordower | 330/38 M X |
| 3,509,364 | 4/1970 | Buckley | 307/237 X |
| 3,544,882 | 12/1970 | Tanaka | 323/4 |
| 3,548,294 | 12/1970 | Houghton | 307/237 X |
| 3,551,836 | 12/1970 | Greeson, Jr. | 330/38 M X |
| 3,555,402 | 1/1971 | Bozarth, Jr. et al. | 330/30 D X |
| 3,629,691 | 12/1971 | Wheatley, Jr. | 307/297 X |
| 3,649,926 | 3/1972 | Hill | 330/30 D |
| 3,652,922 | 3/1972 | Healey et al. | 323/4 |
| 3,679,963 | 7/1972 | Free et al. | 307/297 X |
| 3,701,032 | 10/1972 | Steckler | 330/38 M X |

FOREIGN PATENTS OR APPLICATIONS

| | | | |
|---|---|---|---|
| 1,297,191 | 6/1969 | Germany | 307/297 |
| 1,072,947 | 6/1967 | Great Britain | 307/297 |

OTHER PUBLICATIONS

"Constant–Current Regulator Range Determined by Reference Transistor"; Electronic Design, Vol. 13, No. 9, p. 44–45, 4/19 (Russel).

Weidmann, "Multiple Current Source", IBM Tech. Dis. Bull., Vol. 13, No. 9, p. 2542, 2/1971.

Cabiedes et al., "Precision Integrated Current Source", IBM Tech. Dis. Bull., Vol. 13, No. 9, p. 1699, 11/1970.

Keller et al., "Current Source Generator", Vol. 12, No. 11, p. 2031, 4/1970, IBM Tech. Dis. Bull.

Nallin, "Load Compensated Voltage Regulator", IBM Tech. Disc. Bull., Vol., 13, No. 5, p. 1110–1111, 10/1970.

Berding, "Transistor With Controlled Beta", IBM Tech. Dis. Bull., Vol. 10, No. 2, p. 182–183, 7/1967.

Buckley, "Differential Input Stage", IBM Tech. Dis. Bull. Vol. 12, No. 5, p. 667–668, 10/1969.

Hsieh et al. "Mosfet Storage Chip Bit Line Bias Generator", IBM Tech. Dis. Bull., Vol.13, No. 9, p. 2659, 2/1971.

*Primary Examiner*—John W. Huckert
*Assistant Examiner*—L. N. Anagnos
*Attorney*—Vincent Rauner et al.

[57] ABSTRACT

A transistor connected to a variable load and a suitable source of power to control the current through the load in response to current applied to the base of the transistor and means connected to the base of the transistor for sensing changes in current through said transistor and adjusting the base current to maintain the transistor operating at a predetermined saturation point or forced beta.

8 Claims, 1 Drawing Figure

PATENTED OCT 9 1973 3,764,829
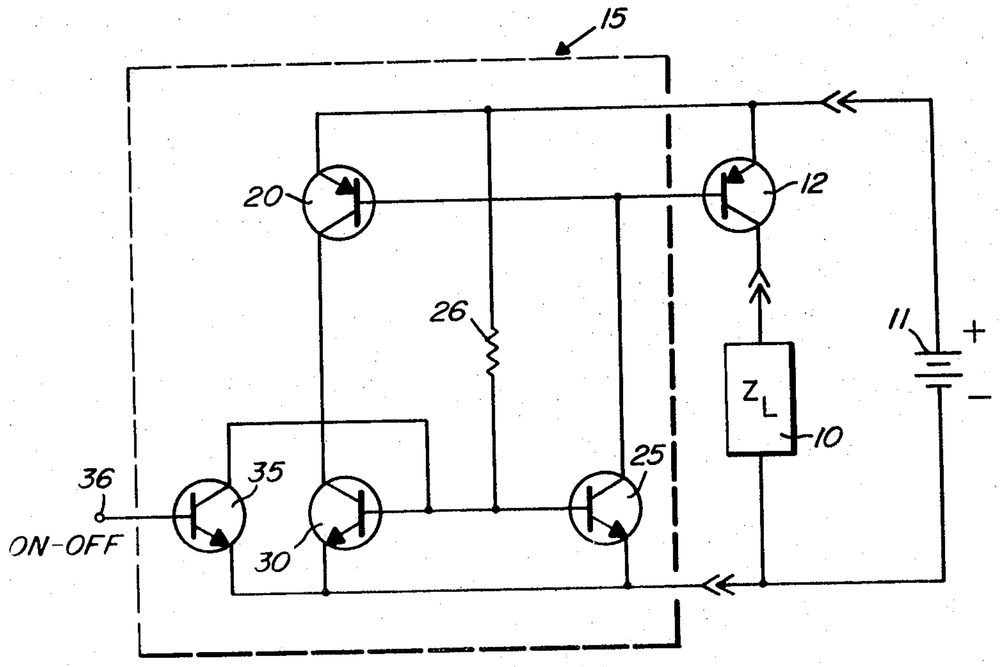

ADAPTIVE TRANSISTOR SWITCH

BACKGROUND OF THE INVENTION

1. FIELD OF THE INVENTION

In most electronic circuits utilizing semiconductor devices, such as transistors, for the switching device, the transistor must operate in a saturation mode to ensure proper switching and maximum transmission of power to the load. However, variations in the load will cause variations in the current passing through the transistor and, if these variations are sufficiently large, may cause the transistor to conduct below saturation.

2. DESCRIPTION OF THE PRIOR ART

In prior art switching circuits, foreseeable variations of the load and transistor current are predicted and base current for the transistor is maintained at a sufficiently high value to cause the transistor to operate in saturation even though the load drops substantially. However, this means that substantial excess current is flowing into the base when the load current is normal or below normal. The excess current flowing into the base of the transistor is wasted since it provides no useful function.

SUMMARY OF THE INVENTION

The present invention pertains to an improved semiconductor switching circuit wherein a transistor is connected to control the current from a suitable source through a load and circuitry is connected to the base of the transistor, which circuitry senses the current through the transistor and adjusts the base current of the transistor to maintain a substantially constant forced beta for said transistor, the forced beta being the ratio of the saturation current to the base current.

It is an object of the present invention to provide an improved semiconductor switching circuit.

It is a further object of the present invention to provide an improved semiconductor switching circuit wherein the forced beta, or degree of saturation, remains substantially constant throughout variations of the load.

It is a further object of the present invention to provide an improved semiconductor switching circuit wherein base current flowing to the semiconductor switch is adjusted, with variations in the load, to maintain the semiconductor switch at a substantially constant, predetermined point of saturation.

It is a further object of the present invention to provide an improved semiconductor switch circuit with an improved operating efficiency.

These and other objects of this invention will become apparent to those skilled in the art upon consideration of the accompanying specification, claims and drawing.

BRIEF DESCRIPTION OF THE DRAWING

The single FIGURE is a schematic diagram of an embodiment of the improved semiconductor switching circuit.

DESCRIPTION OF THE PREFERRED EMBODIMENT

In the FIGURE the numeral 10 designates a load 10, one end of which is connected to the negative terminal of a suitable source of power 11 and the other end of which is connected to the collector of a PNP transistor 12. The emitter of the transistor 12 is connected to the positive terminal of the power source 11 and the base is connected to circuit means, generally designated 15 and encircled by dotted lines, which circuit means 15 will be described in detail presently.

The load 10 may be any load drawing power from the power source 11 capable of being switched on and off by the transistor 12. Further, the load 10 may be variable so that the amount of current drawn through the transistor 12 varies with variations of the load 10. To properly switch power to the load 10, transistor 12 must pass substantially no current in the nonconducting state and must present a relatively low impedance in the conducting state. When transistor 12 is operating in a saturation mode the voltage drop thereacross is at a minimum value. Saturation of transistor 12 may be defined as the operating range in which sufficient base current is applied to the transistor to force the beta (the ratio of collector current to base current) to a predetermined relatively low value compared to this ratio in the active region.

In the present embodiment, variations in the load 10 and consequent variations in collector current of transistor 12 will produce variations in the forced beta of transistor 12 if the base current remains constant. Circuit means 15 are connected to the base of the transistor 12 to vary the base current in accordance with variations of the load 10 and collector current of the transistor 12 to maintain the forced beta of transistor 12 relatively constant.

The base of transistor 12 is connected to the base of a PNP type transistor 20 and to the collector of an NPN type transistor 25. The emitter of the transistor 20 is connected to the positive terminal of the power source 11 and the collector is connected to the collectors of a pair of transistors 30 and 35. The bases of the transistors 25 and 30 are connected together and through a resistor 26 to the positive terminal of the power source 11. The base of the transistor 30 is also connected to the collector of the transistor 30 so that transistor 30 operates as a single junction diode. The emitters of transistors 25, 30 and 35 are connected to the negative terminal of the voltage source 11. The base of the transistor 35 is connected to an input terminal 36 adapted to receive signal voltages for turning on or turning off the transistor 35 and, thus, circuit means 15.

In the operation of the circuit means 15, with a positive voltage applied to the terminal 36, the transistor 35 is saturated so that the bases of the transistors 25 and 30 are approximately at the potential of the negative terminal and, therefore, are in a nonconducting state. With transistor 25 nonconducting no base current flows in either of the transistors 12 or 20 and, therefore, both transistors are also in a nonconducting state. Therefore, no current is being applied to the load 10. When the positive potential applied to terminal 36 is lowered or removed the transistor 35 goes to a nonconducting state and the bases of the transistors 25 and 30 are raised to a sufficiently high potential to produce conduction therein. As transistor 25 begins to conduct a base current path is completed for transistors 12 and 20 so that both of these transistors begin to conduct. Conduction of transistor 12 supplies current to the load 10 from the power source 11.

In the present embodiment, a desired forced beta for transistor 12 is selected, for example 10. The ratio of the effective emitter area of transistor 12 to the effective emitter area of transistor 20 is then made equal to the predetermined forced beta plus 1, or *n*, where *n* is any predetermined number compatible with the circuit components. Since the emitter to base voltage of both of the transistors 12 and 20 is always equal, and since the emitter current is dependent upon the effective emitter area and the emitter to base voltage, the ratio of transistor 12 emitter current to transistor 20 emitter current will always be equal to the forced beta plus 1, or *n*. The effective emitter areas of transistors 25 and 30 are made equal so that the collector current of transistor 25 is equal to the collector current of transistor 30. The collector current of transistor 20, which is approximately equal to the collector current of transistor 30, is very nearly equal to the emitter current of transistor 20, because transistor 20 is operating in the active range and the base current is relatively small. Since the base current of transistor 20 is relatively small, the collector current of transistor 25 is substantially equal to the base current of transistor 12. Thus, the base current of transistor 12 will always be equal to the emitter current of transistor 12 divided by the forced beta plus 1, or *n*. Further, since the emitter current of the transistor 12 is equal to the collector current of transistor 12 plus the base current (which is substantially equal to the collector current of transistor 25), it is obvious that the forced beta of transistor 12 will remain substantially constant at $n-1$.

In the above example a beta of 10 is selected, so that *n* is equal to 11. To implement this beta the effective emitter area of transistor 20 is made one-eleventh as large as the effective emitter area of transistor 12. With these specific sized emitters providing currents as described above, the collector current of transistor 12 will always be ten times as large as the base current (forced beta equal to 10).

Any variation in the load 10 will produce a change in the current flowing through transistor 12 and a consequent change in the emitter to base voltage thereof. This change in emitter to base voltage will be sensed by the transistor 20, which will undergo a similar emitter to base voltage change, resulting in a change in emitter and collector current therethrough. A change in collector current of transistor 20 will result in a change in current through transistor 30 and a change of the base to emitter voltage thereacross. This changed base to emitter voltage will also be apparent at the transistor 25 causing a change in current therethrough. The change in current through transistor 25, which is substantially equal to the base current of transistor 12, causes the beta of transistor 12 to remain at substantially the desired value.

Thus, circuitry is described wherein a semiconductor device is utilized as a switch in conjunction with a variable load and a suitable power source. The semiconductor device is connected to circuit means which sense the current through the device and vary control current to the device to maintain the forced beta of the device relatively constant. Because the control current applied to the semiconductor device is always maintained at a value sufficient to provide the degree of saturation desired, the device consumes less power and is, therefore, more efficient to operate. In addition to compensating for varitions in the load, the present circuitry also compensates for variations in the power source connected thereto. As a further advantage, the described circuitry can be easily incorporated into integrated circuits.

While we have shown and described a specific embodiment of this invention, further modifications and improvements will occur to those skilled in the art. We desire it to be understood, therefore, that this invention is not limited to the particular form shown and we intend in the appended claims to cover all modifications which do not depart from the spirit and scope of this invention.

We claim:

1. An improved semiconductor switching circuit for controlling electrical current through a variable load, comprising a. semiconductor means having first, second and control electrodes with said first and second electrodes adapted to be connected to the variable load and a suitable supply so as to control electrical current flowing through the variable load, and b. circuit means connected to the control electrode of said semiconductor means for controlling the current through said control electrode in response to variations of the variable load to tend to maintain a forced beta substantially constant for said semiconductor means.

2. An improved semiconductor switching circuit as set forth in claim 1 wherein the semiconductor means includes a transistor and the control electrode is a base electrode of said transistor.

3. An imrpoved semiconductor switching circuit for controlling electrical current through a variable load, comprising a. transistor means having a base, an emitter and a collector and adapted to be connected to the variable load and a suitable supply so as to control electrical current flowing through the variable load, and b. circuit means connected to the base of said transistor means for controlling base current in response to variations of the variable load to maintain a forced beta substantially constant for said transistor means.

4. An improved semiconductor switching circuit as set forth in claim 3 wherein the circuit means includes circuitry sensitive to a voltage change across at least part of said transistor means, said voltage sensitive circuitry being connected to said circuit means for limiting the current flowing from the base of said transistor means through said circuit means.

5. An improved semiconductor switching circuit for controlling electrical current through a variable load, comprising:

a. transistor means having a base, an emitter and a collector and adapted to be connected to the variable load and a suitable supply so that collector current flows through the variable load;

b. circuit means connected to the base of said transistor means providing a base current path with a variable characteristic for varying the amount of base current flow in response to variation of said characteristic; and c. said circuit means further being connected to said transistor means for sensing a voltage drop across at least a portion of said transistor means which is proportional to collector current therethrough and for controlling said variable characteristic in response to changes in said voltage drop to tend to maintain a constant ratio between the collector and base current of said transistor means.

6. An improved semiconductor switching circuit as set forth in claim 5 wherein the circuit means includes a semiconductor device and the variable characteristic is the conduction of current therethrough.

7. An improved semiconductor switching circuit as set forth in claim 5 wherein the circuit means includes a semiconductor device for sensing variations in the voltage drop across at least a portion of said transistor means, said semiconductor device having at least one junction connected in parallel with at least one junction of said transistor means and constructed to allow a flow of current therethrough proportional to the flow of current through said one junction of said transistor means.

8. An improved method of controlling electrical current through a variable load, comprising the steps of:

a. connecting a transistor means to said load and to a suitable current source so that load current flows through said transistor means;
b. sensing current flow in said transistor means; and
c. controlling base current in said transistor means in response to said load current flow therethrough for maintaining the forced beta of said transistor means substantially constant.

* * * * *